US012704045B2

(12) United States Patent
Albertz et al.

(10) Patent No.: US 12,704,045 B2
(45) Date of Patent: Aug. 11, 2026

(54) CARBON DIOXIDE SEQUESTRATION IN ENCAPSULATED SALT MINIBASINS

(71) Applicant: SAUDI ARABIAN OIL COMPANY, Dhahran (SA)

(72) Inventors: Markus Albertz, The Woodlands, TX (US); Rajesh Goteti, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 203 days.

(21) Appl. No.: 18/409,658

(22) Filed: Jan. 10, 2024

(65) Prior Publication Data

US 2025/0223889 A1 Jul. 10, 2025

(51) Int. Cl.
*E21B 41/00* (2006.01)
*B65G 5/00* (2006.01)

(52) U.S. Cl.
CPC ............ *E21B 41/0064* (2013.01); *B65G 5/00* (2013.01)

(58) Field of Classification Search
CPC ..... E21B 41/0064; E21B 43/164; B65G 5/00; Y02C 20/40
See application file for complete search history.

(56) References Cited

U.S. PATENT DOCUMENTS 9,816,972 B2 11/2017 Romanak et al.
10,995,972 B2 5/2021 Buscheck
2011/0035154 A1* 2/2011 Kendall .................. C04B 28/10 422/111
2013/0043678 A1* 2/2013 Saar .......................... F02C 1/10 165/45
2013/0170910 A1* 7/2013 Hoier ....................... B65G 5/00 405/53
2016/0060038 A1* 3/2016 Oates ........................ C01B 3/00 62/515
2018/0284305 A1* 10/2018 Kacewicz .............. G01V 20/00
2019/0010059 A1 1/2019 Ashitaka et al.
2022/0341294 A1* 10/2022 Stewart ............... E21B 41/0064

FOREIGN PATENT DOCUMENTS

WO WO-2011050385 A1 * 5/2011 ......... E21B 41/0064
WO 2019010059 A1 1/2019

OTHER PUBLICATIONS

Aya, I., et al; 1997; Solubility of CO2 and density of CO2 hydrate at 30 MPa. Energy, 22, 263-271.
Bachu, S.; 2015; Review of CO2 storage efficiency in deep saline aquifers. International Journal of Greenhouse Gas Control, 40, 188-202.

(Continued)

*Primary Examiner* — Carib A Oquendo
(74) *Attorney, Agent, or Firm* — Vorys, Sater, Seymour and Pease LLP

(57) ABSTRACT

Methods for carbon dioxide sequestration may comprise: introducing a fluid stream comprising carbon dioxide into an encapsulated salt minibasin, the encapsulated salt minibasin being surrounded by a salt barrier defining one or more boundaries thereof; and storing carbon dioxide from the fluid stream within the encapsulated salt minibasin after introduction thereto, the salt barrier retaining the carbon dioxide within the encapsulated salt minibasin.

22 Claims, 4 Drawing Sheets

(56) References Cited

OTHER PUBLICATIONS

Bodunde, S. S. et al; 2018; Integration of 3D-seismic and petrophysical analysis with rock physics analysis in the characterization of SOKAB field, Niger delta, Nigeria. Journal of Petroleum Exploration and Production Technology, 9, 899-909.
Callot, J.-P., et al; 2016; Three-dimensional evolution of salt-controlled minibasins: Interactions, folding and megaflap development. AAPG Bulletin, 100, 1419-1442.
Cedeno, A., et al; 2019; The Impact of Salt Tectonics on the Thermal Evolution and the Petroleum System of Confined Rift Basins: Insights from Basin Modeling of the Nordkapp Basin, Norwegian Barents Sea. Geosciences, 9.
Corelab. 2022. Routine Rock Properties [Online]. Available: https://www.corelab.com/cli/routine-rock/core-measurement-system [Accessed Jun. 22, 2022].
Dorn, G. A. 1998. Modern 3-D seismic interpretation. The Leading Edge, 17, 1262-1262.
Duan, Z., et al; 1995; Equation of state for the NaCl—H2O—CO2 system: Prediction of phase equlibria and volumetric properties. 59, 2869-2882.
Duffy, O. B., et al; 2019; Obstructed minibasins on a salt-detached slope: An example from above the Sigsbee canopy, northern Gulf of Mexico. Basin Research, 32, 505-524.
Ehrenberg, S. N.; 2007; Whole core versus plugs: Scale dependence of porosity and permeability measurements in platform carbonates. AAPG Bulletin, 91, 835-846.
Enick, R. M. et al; 2009; CO2 Solubility in Water and Brine under Reservoir Conditions. Chemical Engineering Communications, 90, 23-33.
Fernandez, N., et al; 2020; Abstract; Influence of minibasin obstruction on canopy dynamics in the northern Gulf of Mexico. Basin Research, 33, 427-446.
Garcia, S., et al; 2010; Underground carbon dioxide storage in saline formations. Proceedings of the Institution of Civil Engineers—Waste and Resource Management, 163, 77-88.
Goodman, A., et al; 2016; Prospective CO2 saline resource estimation methodology: Refinement of existing US-DOE-NETL methods based on data availability. International Journal of Greenhouse Gas Control, 54, 242-249.
Hearon, T. E., et al; 2015; Geology and tectonics of Neoproterozoic salt diapirs and salt sheets in the eastern Willouran Ranges, South Australia. Basin Research, 27, 183-207.
Helle, H. B., et al; 2001; Porosity and permeability prediction from wireline logs using artificial neural networks: a North Sea case study. Geophysical Prospecting, 49, 431-444.
Hemmati-Sarapardeh, A., et al; 2020; Modeling CO2 Solubility in Water at High Pressure and Temperature Conditions. Energy & Fuels, 34, 4761-4776.
Hudec, M. R., Jackson, M. P. A. & Schultz-Ela, D. D. 2009. The paradox of minibasin subsidence into salt: Clues to the evolution of crustal basins. Geological Society of America Bulletin, 121, 201-221.
Jackson, C. A.-L. 2012. The initiation of submarine slope failure and the emplacement of mass transport complexes in salt-related minibasins: A three-dimensional seismic-reflection case study from the Santos Basin, offshore Brazil. Geological Society of America Bulletin, 124, 746-761.
Jackson, C. A. L., Duffy, O. B., Fernandez, N., Dooley, T. P., Hudec, M. R., Jackson, M. P. A. & Burg, G. 2020. The stratigraphic record of minibasin subsidence, Precaspian Basin, Kazakhstan. Basin Research, 32, 739-763.
Jackson, M. P. A., et al; 20104 Some emerging concepts in salt tectonics in the deepwater Gulf of Mexico: intrusive plumes, canopy-margin thrusts, minibasin triggers and allochthonous fragments. Geological Society, London, Petroleum Geology Conference Series, 7, 899-912.
Kelemen, P., et al; 20194 An Overview of the Status and Challenges of CO2 Storage in Minerals and Geological Formations. Frontiers in Climate, 1.
Kou, Z., et al; 2021; A fast and reliable methodology to evaluate maximum CO2 storage capacity of depleted coal seams: A case study. Energy, 231.
Lackner, K. S., et al; 1995; Carbon Dioxide Disposal in Carbonate Minerals. Energy, 20, 1153-1170.
Lenormand, R. et al; 2007; Advances in Measuring Porosity and Permeability From Drill Cuttings. SPE/EAGE Reservoir Characterization and Simulation Conference. Abu Dhabi, U.A.E.: Society of Petroleum Engineers.
Liu, S., et al; 2018; Three-dimensional digitalization modeling characterization of pores in high-rank coal in the southern Qinshui basin. Geosciences Journal, 23, 175-188.
McCain, W. D. 1991. Reservoir-Fluid Property Correlations—State of the Art. SPE Reservoir Engineering, 6, 266-272.
Mount, V. S., et al; 2006; Abstract Petroleum system observations and interpretation in the vicinity of the K2/K2-North, Genghis Khan, and Marco Polo fields, Green Canyon, Gulf of Mexico. Gulf Coast Association of Geological Societies Transactions, 56, 613-625.
NETL 2010. Carbon Dioxide Enhanced Oil Recovery. U.S. Department of Energy, National Energy Technology Laboratory.
Nthunya, L., et al; 2018; Spectroscopic Determination of Water Salinity in Brackish Surface Water in Nandoni Dam, at Vhembe District, Limpopo Province, South Africa. Water, 10.
Pilcher, R. S., et al; 2011; Primary basins and their boundaries in the deep-water northern Gulf of Mexico: Origin, trap types, and petroleum system implications. AAPG Bulletin, 95, 219-240.
Ringenbach, J. C., et al; 2013; Salt tectonics in the Sivas Basin, Turkey: outstanding seismic analogues from outcrops. First Break, 31.
Seifritz, W. 1990. CO2 Disposal by Means of Silicates. Nature, 345, 486.
Span, R. et al; 1996; A New Equation of State for Carbon Dioxide Covering the Fluid Region from the Triple-Point Temperature to 1100 K at Pressures up to 800 MPa. Journal of Physical and Chemical Reference Data, 25, 1509-1596.
Yan, W., et al; 2011; Measurement and modeling of CO2 solubility in NaCl brine and CO2-saturated NaCl brine density. International Journal of Greenhouse Gas Control, 5, 1460-1477.
Zijp, M. H. A. A., et al4 2018; Stringers in salt as a drilling risk. TNO Report. Utrecht, The Netherlands.
Ulfah, Melianna, Plume migration and pressure evolution analyses for recommendations in offshore $CO_2$ storage acreage leasing policy, UT Electronic Theses and Dissertations, (2021), retrieved from https://repositories.lib.utexas.edu/handle/2152/94604.

* cited by examiner

200

CARBON DIOXIDE SEQUESTRATION IN ENCAPSULATED SALT MINIBASINS

FIELD OF THE DISCLOSURE

The present disclosure relates generally to carbon dioxide sequestration and, more particularly, to methods and systems facilitating carbon dioxide sequestration in salt minibasins.

BACKGROUND OF THE DISCLOSURE

Carbon dioxide ($CO_2$) is a greenhouse gas that contributes to global atmospheric warming. With carbon dioxide emissions continuing to increase as a consequence of human activities, there has been growing interest in ways to remove carbon dioxide from the atmosphere and then sequester the carbon dioxide for long-term storage.

Several approaches for sequestering carbon dioxide in geological formations have received considerable study. Among these approaches are 1) $CO_2$ storage in depleted oil and gas reservoirs, 2) $CO_2$ injection into deep saline aquifers, 3) $CO_2$ injection into coal seams, 4) $CO_2$ retention during enhanced oil recovery (EOR), and 5) carbon mineralization (carbonate production) within a formation. The requirements for sequestering carbon dioxide in a geological formation are similar in many respects to the factors promoting ready retention and production of a hydrocarbon resource. Namely, the formation matrix needs to have adequate porosity and permeability to promote fluid storage, and a trapping configuration below a scaling rock (cap rock) usually needs to be present to maintain the fluid within the geological formation over the long term. That is, the factors that may promote long-term retention of a hydrocarbon resource within a geological formation may similarly promote retention of carbon dioxide as well. Natural buoyancy of carbon dioxide can make retention problematic in many instances, especially if a suitable trapping configuration is not present. Carbon mineralization resolves the buoyancy issue by forming carbon-containing solids naturally or via accelerated mineralization chemistries to produce calcium, magnesium, or iron carbonate solids that are usually identical to the naturally occurring minerals. However, carbon mineralization methods are not as well developed at this juncture relative to approaches for sequestering fluids comprising carbon dioxide.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods for carbon dioxide sequestration comprise: introducing a fluid stream comprising carbon dioxide into an encapsulated salt minibasin, the encapsulated salt minibasin being surrounded by a salt barrier defining one or more boundaries thereof; and storing carbon dioxide from the fluid stream within the encapsulated salt minibasin after introduction thereto, the salt barrier retaining the carbon dioxide within the encapsulated salt minibasin.

In another embodiment, methods for carbon dioxide sequestration comprise: providing a fluid stream comprising a carbonated aqueous fluid, gaseous carbon dioxide, supercritical carbon dioxide, or any combination thereof; introducing the fluid stream into an encapsulated salt minibasin, the encapsulated salt minibasin containing formation water native to the encapsulated salt minibasin and the encapsulated salt minibasin being surrounded by a salt barrier defining one or more boundaries of the encapsulated salt minibasin; withdrawing at least a portion of the formation water from the encapsulated salt minibasin to decrease pressure therein; and storing carbon dioxide from the fluid stream within the encapsulated salt minibasin after introduction thereto, the salt barrier retaining the carbon dioxide within the encapsulated salt minibasin.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments in accordance with the present disclosure generally relate to carbon dioxide sequestration and, more particularly, to methods and systems facilitating carbon dioxide sequestration in salt minibasins.

As discussed above, there is increasing interest in carbon dioxide sequestration to mitigate the effects of atmospheric global warming. Several approaches have been developed to promote carbon dioxide sequestration in geological formations of various types. Although these sequestration approaches may be successful to varying degrees, there is still a need for alternative approaches for promoting geological sequestration of carbon dioxide.

Figure 1:
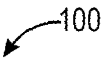
FIG. 1 is a diagram of an illustrative open salt minibasin.
Figure 1:
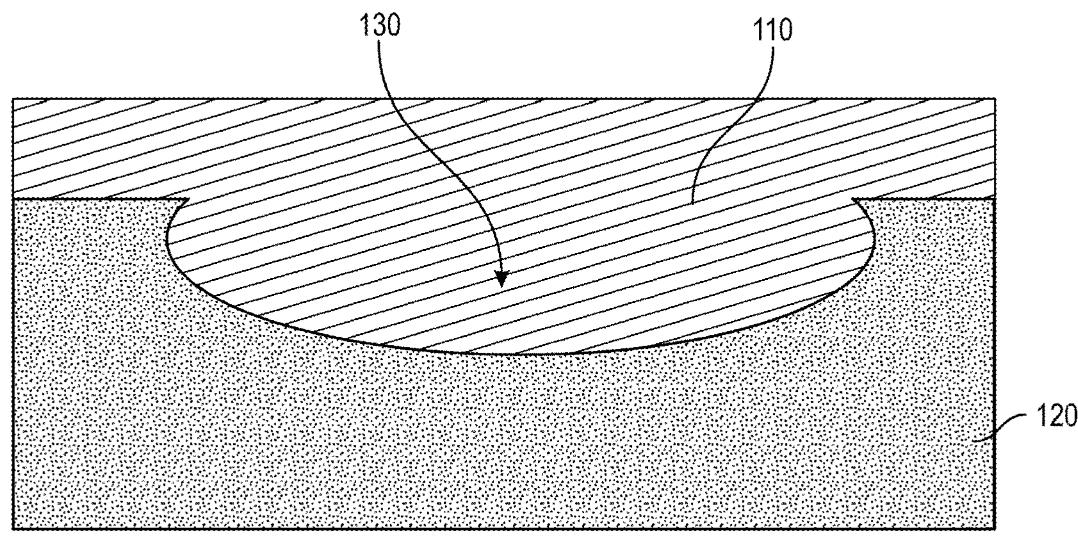
Figure 2:
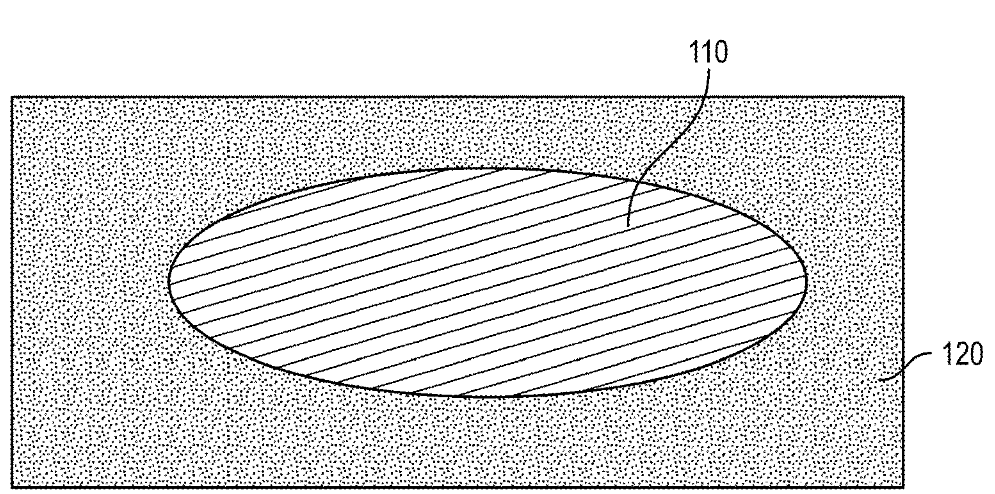
FIG. 2 is a diagram of an illustrative encapsulated salt minibasin.

The present disclosure provides various approaches for sequestering carbon dioxide in salt minibasins (also sometimes referred to as salt withdrawal basins or salt expulsion basins). As used herein, the term "salt minibasin" refers to a sedimentary rock deposit that has sunk into a surrounding salt layer. The salt layer forms a dense barrier around the sedimentary rock deposit. Salt minibasins usually have a largest dimension of only a few tens of kilometers (e.g., about 100 km or less, or about 90 km or less, or about 80 km or less, or about 70 km or less, or about 60 km or less, or about 50 km or less) and are distinguished in at least this respect from ordinary sedimentary basins which may be distributed over a much larger geological region. There are two types of salt minibasins: open salt minibasins having a concave (bowl) shape, and encapsulated salt minibasins. FIG. 1 is a diagram of an illustrative open salt minibasin. As shown, open salt minibasin 100 includes sedimentary rock deposit 110 which is partially surrounded by salt barrier 120. Specifically, sedimentary rock deposit 110 is surrounded laterally and beneath by salt barrier 120, but the top of concave portion 130 is open, such that there is no discrete trapping configuration for maintaining fluids therein. FIG. 2 is a diagram of an illustrative encapsulated salt minibasin. Encapsulated salt minibasin 200 is similar to open salt minibasin 100, except salt barrier 120 completely surrounds sedimentary rock deposit 110. In encapsulated salt minibasin 200, the upper portion of salt barrier 120 forms a trapping configuration above sedimentary rock deposit 110, which is not present in open salt minibasin 100 (FIG. 1).

Using salt minibasins for promoting sequestration of carbon dioxide may be advantageous for a number of reasons. Foremost, the salt barrier at least partially surrounding the sedimentary rock deposit in salt minibasins is very impermeable and may aid in retaining carbon dioxide trapped in various forms within the high porosity of the sedimentary rock deposit. In addition, salt minibasins are commonly occurring geological structures throughout the world (numerous salt minibasins are found in the Gulf of Mexico, for instance), and some may have existing equipment previously used for producing a hydrocarbon resource from the sedimentary rock deposit. The existing production equipment may be modified for introducing carbon dioxide in a suitable form into the sedimentary rock deposit according to the disclosure herein, thereby providing beneficial cost savings. Other types of salt minibasins do not contain (or never contained) a hydrocarbon resource but may still be utilized for carbon dioxide sequestration after installing appropriate equipment for introducing carbon dioxide thereto according to the disclosure herein.

Encapsulated salt minibasins may be used to sequester carbon dioxide in any of a variety of forms due to the closed salt barrier surrounding the sedimentary rock deposit. Advantageously, encapsulated salt minibasins may be utilized to sequester carbon dioxide in either a buoyant form or a negatively buoyant form by virtue of the closed salt barrier surrounding an encapsulated salt minibasin. Buoyant forms of carbon dioxide include, for example, gaseous carbon dioxide, supercritical carbon dioxide, and carbonated aqueous fluids such as carbonated aqueous salt solutions, and carbonated fresh water. As the name indicates, carbon dioxide in buoyant forms tends to rise. Alternately, a fluid containing carbon dioxide and having positive buoyancy tends to rise. The carbon dioxide in negatively buoyant forms of carbon dioxide tends to sink. Negatively buoyant forms of carbon dioxide include carbonated aqueous brines, although some lighter carbonated brines could be positively buoyant depending on conditions. Only negatively buoyant forms of carbon dioxide may be sequestered in open salt minibasins when overlaid by a lighter aqueous fluid defining a barrier layer. Encapsulated salt minibasins, in contrast, present no such limitations.

Another advantage afforded by encapsulated salt minibasins is that they are very tolerant of high-pressure fluid introduction without undergoing fracturing of the salt barrier. Formation water may be withdrawn from the encapsulated salt minibasin to manage pressure therein on an as-needed basis, and the withdrawn formation water or a portion thereof may be utilized to dissolve carbon dioxide as a carbonated aqueous fluid for re-introduction downhole. While reintroduction of the formation water (or a carbonated aqueous fluid generated from formation water) with carbon dioxide dissolved therein leads to a pressure increase within the encapsulated salt minibasin, the solubility of carbon dioxide may also rise under the increased pressure. Therefore, by sequentially withdrawing and reintroducing formation water (or a carbonated aqueous fluid generated from formation water) to the encapsulated salt minibasin following dissolution of carbon dioxide therein, increasingly higher quantities of carbon dioxide may be sequestered in the encapsulated salt minibasin. A working pressure limit for fluid introduction within the encapsulated salt minibasin may be dictated by the lithostatic pressure at the top of the encapsulated salt minibasin, as described further hereinbelow. A practical working pressure limit for the encapsulated salt minibasin may, in some instances, be governed by equipment limitations (e.g., pumps, lines, and the like) rather than the lithostatic pressure of the encapsulated salt minibasin itself.

As another related advantage, the subterranean temperature in encapsulated salt minibasins is lower than would be expected at a given subterranean depth (i.e., within a geological formation of comparable depth, but that is not an encapsulated salt minibasin). Without being bound by theory or mechanism, the salt diapirs between encapsulated salt minibasins are believed to temper the temperature increase that commonly occurs with increasing subterranean depth. Solubility of carbon dioxide tends to decrease with increasing temperature. Hence, encapsulated salt minibasins may be advantageous compared to other types of subterranean reservoirs by virtue of their ability to afford higher carbon dioxide solubility at a specified subterranean depth by maintaining a lower temperature.

Accordingly, carbon dioxide sequestration methods of the present disclosure may comprise: introducing a fluid stream comprising carbon dioxide into an encapsulated salt minibasin; and storing carbon dioxide from the fluid stream within the encapsulated salt minibasin after introduction thereto. The encapsulated salt minibasin is surrounded by a salt barrier defining one or more boundaries thereof, and the salt barrier retains the carbon dioxide within the encapsulated salt minibasin. A formation water native to the encapsulated salt minibasin may be present within the encapsulated salt minibasin. The formation water may comprise a brine. At least a portion of the formation water may be withdrawn from the encapsulated salt minibasin in some cases. Optionally, at least a portion of the formation water may be combined with carbon dioxide to generate a carbonated aqueous fluid for re-introduction to the encapsulated salt minibasin. Further details regarding the foregoing are provided below.

The fluid stream comprising carbon dioxide may introduce carbon dioxide into the encapsulated salt minibasin in a suitable fluid state. In non-limiting examples, the fluid stream may comprise a carbonated aqueous fluid, gaseous carbon dioxide, supercritical carbon dioxide, or any combination thereof. Introduction within a carbonated aqueous fluid may be particularly desirable. Suitable carbonated aqueous fluids may include carbonated aqueous brines, carbonated aqueous salt solutions, carbonated fresh water, or any combination thereof. Gaseous carbon dioxide and supercritical carbon dioxide provide the carbon dioxide in a buoyant state. Carbonated aqueous fluids, in contrast, may provide the carbon dioxide in a buoyant (positively buoyant) or negatively buoyant state depending on the density of the carbonated aqueous fluid. Carbonated aqueous brines, for example, may be negatively buoyant in many instances. Carbon dioxide in either a buoyant state or a negatively buoyant state may be effectively sequestered in an encapsulated salt minibasin according to the disclosure herein.

When dissolving carbon dioxide in a brine, the resulting carbonated aqueous brine may be negatively buoyant by virtue of a density increase that occurs upon dissolving carbon dioxide into an aqueous brine. For example, saturating a brine with carbon dioxide affords a 2-3% increase in density relative to the uncarbonated brine. A similar increase in density may be realized upon dissolving carbon dioxide in other aqueous fluids, such as an aqueous salt solution or fresh water. By virtue of the already high density of an aqueous brine and the resulting density increase upon dissolving carbon dioxide therein, a carbonated aqueous brine may be negatively buoyant relative to other water sources, such as a formation water natively present within the encapsulated salt minibasin. Thus, a carbonated aqueous brine may sink below formation water (or other aqueous fluid introduced to the encapsulated salt minibasin), within the encapsulated salt minibasin. Depending on the desired density of a carbonated aqueous fluid, an appropriate aqueous fluid source having a desired starting density may be selected when forming the carbonated aqueous fluid. Various aqueous fluids ranging from fresh water to aqueous salt solutions to high-salinity brines, or combinations thereof, may be utilized to form the carbonated aqueous fluid, depending on the desired density in the resulting carbonated aqueous fluid. Formation water withdrawn from the encapsulated salt minibasin may be utilized to form at least a portion of the carbonated aqueous fluid, as discussed in further detail below.

The encapsulated salt minibasin is not producing a hydrocarbon resource when the fluid stream comprising carbon dioxide is being introduced thereto. The encapsulated salt minibasin may or may not have previously produced a hydrocarbon resource (or never contained a hydrocarbon resource), but if the encapsulated salt minibasin previously produced a hydrocarbon resource, the hydrocarbon resource is no longer being produced from the encapsulated salt minibasin once the fluid stream comprising carbon dioxide is being introduced thereto. Preferably, the encapsulated salt minibasin may be substantially devoid (absent) of a producible hydrocarbon resource. Absence of a hydrocarbon resource in the encapsulated salt minibasin may leave the porosity of the sedimentary rock deposit available for storage of carbon dioxide in a suitable fluid form in accordance with the disclosure herein.

In some embodiments, the fluid stream may comprise a carbonated aqueous fluid, which may be formed by dissolving carbon dioxide in an aqueous fluid obtained from a suitable source. The source used to provide the aqueous fluid for forming the carbonated aqueous fluid may include, for example, fresh water (e.g., fluid stream water, lake water, or municipal treated water), non-potable water such as gray water or industrial process water, sea water, brine, aqueous salt solutions, partially desalinated water, produced water (including brine and other salt water solutions), or any combination thereof. Produced water may include formation water obtained from the encapsulated salt minibasin, formation water or flowback water produced from nearby a hydrocarbon-producing well, or the like. As used herein, the term “brine” refers to a saturated aqueous salt solution. An “aqueous salt solution” has a salt concentration (salinity) less than that of brine. When produced formation water (withdrawn formation water) is used to form the carbonated aqueous fluid in the disclosure herein, at least a portion of the formation water may be withdrawn (produced) from the encapsulated salt minibasin prior to or concurrently with introducing the fluid stream comprising carbon dioxide to the encapsulated salt minibasin. Withdrawing at least a portion of the formation water may afford an initial pressure decrease within the encapsulated salt minibasin. At least a portion of the formation water withdrawn from the encapsulated salt minibasin may then be combined with carbon dioxide to form at least a portion of the carbonated aqueous fluid. Optionally, when using produced formation water to generate a carbonated aqueous fluid, another aqueous fluid (e.g., a brine, an aqueous salt solution, or fresh water) may be combined with the produced formation water in various proportions, such as to adjust the density of the carbonated aqueous fluid or to increase the volume of carbonated aqueous fluid being introduced to the encapsulated salt minibasin.

Accordingly, in some embodiments, the carbonated aqueous fluid introduced to the encapsulated salt minibasin may comprise a carbonated brine or a carbonated aqueous salt solution. As non-limiting examples, carbonated aqueous salt solutions may be formed by introducing carbon dioxide to an aqueous salt solution, a mixture of brine and an aqueous salt solution, a mixture of brine and fresh water or other water source having a low salinity, or the like. Any of the foregoing may comprise produced formation water.

When produced formation water is used in combination with another aqueous fluid to form a carbonated aqueous fluid, the produced formation water may be combined with the other aqueous fluid in a volume ratio ranging from about 1:99 to about 99:1, depending on the targeted density of the carbonated aqueous fluid, the inventories of the produced formation water and the other aqueous fluid, and the like.

In some instances, formation water may be withdrawn from the encapsulated salt minibasin without using the produced formation water to form a carbonated aqueous fluid or a portion thereof. For example, if excessive formation water is present in pore space that might otherwise be filled with a suitable fluid from the fluid stream comprising carbon dioxide, at least a portion of the formation water may be withdrawn without being combined with carbon dioxide. The produced formation water may be discarded, treated, reformulated into a treatment fluid, re-injected into a nearby subterranean formation, or the like, as non-limiting examples. As non-limiting examples, the formation water may be withdrawn without being recombined with carbon dioxide if the fluid stream is introducing supercritical carbon dioxide or gaseous carbon dioxide to the encapsulated salt minibasin. It is to be appreciated, however, that formation water may also be withdrawn without being recombined with carbon dioxide when the fluid stream comprises a carbonated aqueous fluid as well.

When a carbonated aqueous fluid is introduced to the encapsulated salt minibasin, the carbon dioxide may be dissolved in a chosen aqueous fluid in any suitable manner to provide the resulting carbonated aqueous fluid for introduction to the encapsulated salt minibasin. In some embodiments, the carbon dioxide may be dissolved in a surface facility in fluid communication with an injection well penetrating the encapsulated salt minibasin. In other embodiments, the carbon dioxide may be dissolved in a suitable aqueous fluid as the carbon dioxide and the aqueous fluid are being introduced into the encapsulated salt minibasin via an injection well penetrating the encapsulated salt minibasin. In either case, suitable dissolution techniques may involve pressurized mixing of the carbon dioxide with the aqueous fluid to form the carbonated aqueous fluid or simply by bubbling or injecting the carbon dioxide into the aqueous fluid or a fluid stream of the aqueous fluid. Preferably, the carbonated aqueous fluid may be saturated or nearly saturated with carbon dioxide under the mixing conditions, such that a maximum amount of carbon dioxide storage may be realized. It is to be appreciated, however, that sub-saturation amounts of carbon dioxide also reside within the scope of the present disclosure and may be appropriate depending on circumstances. Alternately, the surface facility may provide supercritical carbon dioxide or gaseous carbon dioxide for introduction to the encapsulated salt minibasin.

In addition, a carbonated aqueous fluid may be withdrawn from the encapsulated salt minibasin at a first pressure and then undergo re-introduction thereto after dissolving additional carbon dioxide in the carbonated aqueous fluid. The carbonated aqueous fluid may be reinjected to the encapsulated salt minibasin at a second pressure higher than the first pressure at which the carbonated aqueous fluid is withdrawn from the encapsulated salt minibasin. The higher pressure may support increased dissolution of carbon dioxide within the carbonated aqueous fluid, thereby allowing a higher amount of carbon dioxide to be sequestered within the encapsulated salt minibasin.

Figure 3:
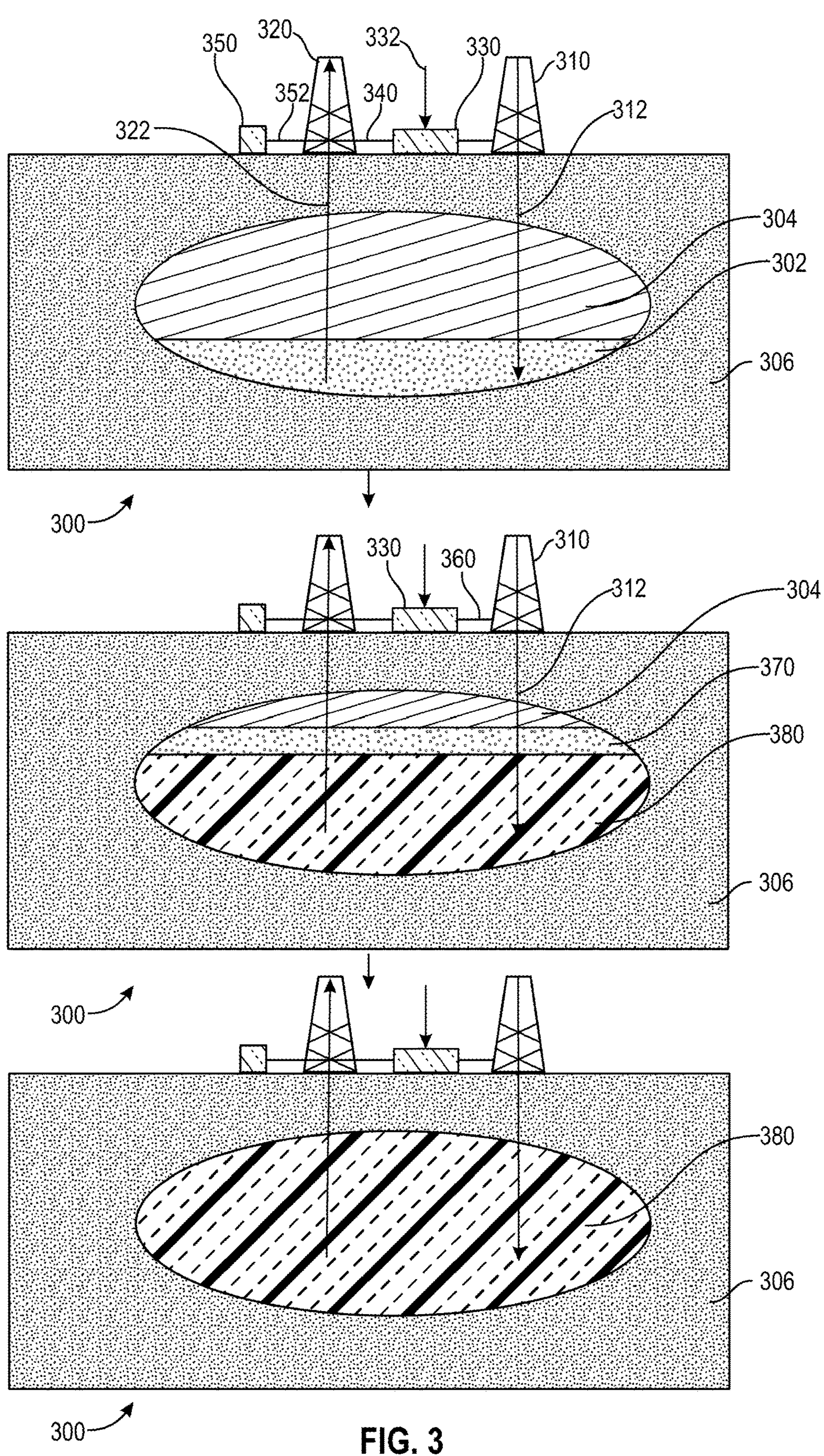
FIG. 3 is a diagram showing how carbon dioxide may be sequestered in an encapsulated salt minibasin in accordance with the disclosure herein.

FIG. 3 is a diagram showing how carbon dioxide may be sequestered in an encapsulated salt minibasin in accordance with the disclosure herein. As shown, encapsulated salt minibasin 300, which is similar to encapsulated salt minibasin 200 in FIG. 2, contains formation water 302 within sedimentary rock deposit 304. Sedimentary rock deposit 304 is surrounded by salt barrier 306. Injection well 310 contains wellbore 312 that extends into sedimentary rock deposit 304. Production well 320 penetrates sedimentary rock deposit 304 and is configured to withdraw a portion of formation water 302 from sedimentary rock deposit 304 via wellbore 322. Production well 320 may be repurposed from prior hydrocarbon resource production, or production well 320 may be newly constructed to facilitate introduction of carbon dioxide to encapsulated salt minibasin 300 in accordance with the disclosure herein. Injection well 310 may likewise have been repurposed from prior hydrocarbon resource production or newly constructed to facilitate introduction of carbon dioxide to encapsulated salt minibasin 300 in accordance with the disclosure herein.

Surface facility 330 may promote mixing of carbon dioxide with a suitable aqueous fluid to form a carbonated aqueous fluid for injection into encapsulated salt minibasin 300 via wellbore 312. The aqueous fluid mixed with carbon dioxide in surface facility 330 may be obtained from an external source and delivered by line 332, and/or at least some of the aqueous fluid delivered to surface facility 330 may comprise formation water 302 withdrawn via wellbore 322. If formation water 302 is withdrawn, it may be delivered to surface facility 330 via line 340 to form the carbonated aqueous fluid. Alternately, formation water 302 may be delivered to disposal location 350 via line 352. Disposal location 350 may include a vehicle, holding tank or pond, other injection well, or any combination thereof. Withdrawal of formation water 302 without forming carbonated aqueous fluid therefrom may take place, for example, when excess formation water 302 is present in encapsulated salt minibasin 300 and additional storage capacity for the carbonated aqueous fluid needs to be created and/or formation water 302 may not suitably be used to form a carbonated aqueous fluid, optionally after being mixed with an aqueous fluid originating from another source (e.g., an externally sourced brine or aqueous salt solution).

As another example, surface facility 330 may be used to generate or provide supercritical carbon dioxide or gaseous carbon dioxide for introduction to encapsulated salt minibasin 300 via wellbore 312. When surface facility 330 generates or provides supercritical carbon dioxide or gaseous carbon dioxide, line 340 may be omitted, and formation water 302 may be diverted to disposal location 350 via line 352. Likewise, line 332 providing external aqueous fluid may be omitted when surface facility 330 generates or provides supercritical carbon dioxide or gaseous carbon dioxide.

As a carbonated aqueous fluid (or supercritical carbon dioxide or gaseous carbon dioxide) is produced or provided in surface facility 330, the carbonated aqueous fluid (or supercritical carbon dioxide or gaseous carbon dioxide) is conveyed by line 360 to wellbore 312 for delivery to encapsulated salt minibasin 300. Although not shown in FIG. 3, carbon dioxide and a suitable aqueous fluid may be mixed in a wellhead of injection well 310 and/or wellbore 312 to promote delivery of carbonated aqueous fluid to encapsulated salt minibasin 300.

Once the carbonated aqueous fluid (or supercritical carbon dioxide) is delivered to encapsulated salt minibasin 300, the carbonated aqueous fluid (or supercritical carbon dioxide) displaces formation water 302 to form carbonated aqueous fluid layer 380 (or supercritical carbon dioxide layer 380) and formation water layer 370. Although formation water layer 370 is shown above carbonated aqueous fluid layer 380 (or supercritical carbon dioxide layer 380) in FIG. 3, meaning that formation water layer 370 is the less dense of these layers, it is to be appreciated that formation water layer 370 may be more dense in some circumstances, such as whether a carbonated aqueous fluid or supercritical carbon dioxide is being introduced to encapsulated salt minibasin 300. As further shown in FIG. 3, some of sedimentary rock deposit 304 may remain unfilled with carbonated aqueous fluid layer 380 (or supercritical carbon dioxide layer 380) and formation water layer 370. As additional formation water 302 is withdrawn from formation water layer 370 and more carbonated aqueous fluid or supercritical carbon dioxide is introduced into encapsulated salt minibasin, carbonated aqueous fluid layer 380 (or supercritical carbon dioxide layer 380) may replace or displace formation water layer 370 to fill substantially the entirety of the available pore space within encapsulated salt minibasin 300. Introduction of the carbonated aqueous fluid or supercritical carbon dioxide may reach or near the maximum working pressure of encapsulated salt minibasin 300, which may be dictated by, among other factors, the strength of salt barrier 306 and the maximum working pressure of wellbore 312 and pumps (not shown in FIG. 3) for introducing carbon dioxide to encapsulated salt minibasin 300 in a suitable form. Formation water 302 and/or carbonated aqueous fluid layer 380 may be withdrawn from encapsulated salt minibasin 300 and then undergo re-injection thereto at a higher pressure to promote sequestration of more carbon dioxide therein. This process may be reiterated until the maximum working pressure of encapsulated salt minibasin 300 is reached. Once introduced to encapsulated salt minibasin 300, carbonated aqueous fluid layer 380 (or supercritical carbon dioxide layer 380) is surrounded by salt barrier 306 and remains trapped therein.

Accordingly, some or other embodiments of the present disclosure may comprise: providing a fluid stream comprising a carbonated aqueous fluid, gaseous carbon dioxide, supercritical carbon dioxide, or any combination thereof; introducing the fluid stream into an encapsulated salt minibasin, the encapsulated salt minibasin containing formation water native to the encapsulated salt minibasin and the encapsulated salt minibasin being surrounded by a salt barrier defining one or more boundaries of the encapsulated salt minibasin; withdrawing at least a portion of the formation water from the encapsulated salt minibasin to decrease pressure therein; and storing carbon dioxide from the fluid stream within the encapsulated salt minibasin after introduction thereto, the salt barrier retaining the carbon dioxide within the encapsulated salt minibasin.

In the course of sequestering carbon dioxide in an encapsulated salt minibasin in accordance with the disclosure above, various additional operations may be undertaken to identify suitable encapsulated salt minibasins for carbon dioxide storage, to determine a suitable form for sequestering carbon dioxide in a specified salt minibasin, suitable pressures for introducing carbon dioxide to an encapsulated salt minibasin, and the like.

Figure 4:
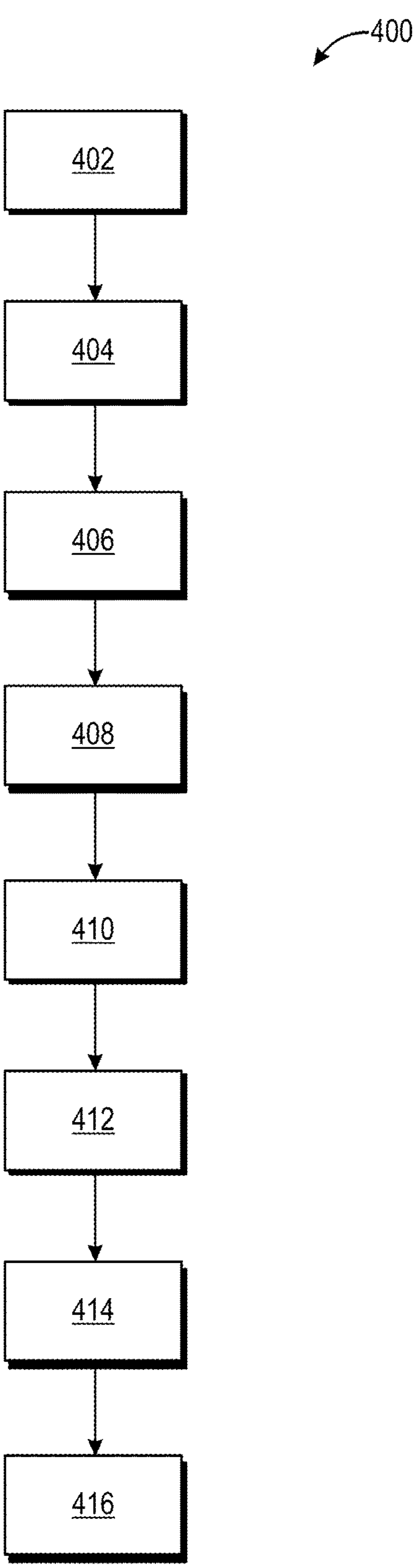
FIG. 4 is a process flow diagram showing further operations that may take place in the course of introducing carbon dioxide into an encapsulated salt minibasin in accordance with the disclosure herein.

FIG. 4 is a process flow diagram showing further operations that may take place in the course of introducing carbon dioxide into an encapsulated salt minibasin in accordance with the disclosure herein. It is to be appreciated that the process flow depicted in FIG. 4 is illustrative and non-limiting. Not every operation depicted in FIG. 4 is necessarily conducted in each instance of introducing a specified form of carbon dioxide into a given encapsulated salt minibasin. Moreover, in some instances, additional operations further to those depicted in FIG. 4 may take place and/or the operations need not necessarily take place in the order depicted As shown in FIG. 4, process 400 may include identifying 402 one or more salt minibasins using standard seismic techniques, among which may be an encapsulated salt minibasin. Mapping 404 of the encapsulated salt minibasin may then be conducted. Parameters determined during mapping may include, for example, dimensions and volume of the encapsulated salt minibasin, depth of the sedimentary rock deposit below the mudline, depth and/or width of the salt barrier at various locations, and the like.

Once the encapsulated salt minibasin has been suitably analyzed by mapping 404, the carbon dioxide storage capacity may be calculated 406 in accordance with Equation 1

$$G_{CO_2} = A_t h_g \phi_t \rho E_{saline} \qquad \text{Equation 1}$$

wherein $G_{CO_2}$ is the mass estimate of carbon dioxide storage, $A_t$ is total area being assessed for carbon dioxide storage, $h_g$ is the gross thickness of the region defined by $A_t$, $\phi$ is the total porosity of the sedimentary rock deposit, $\rho$ is the density of carbon dioxide under the conditions present in the encapsulated salt minibasin, and $E_{saline}$ is the carbon dioxide storage efficiency factor. $E_{saline}$ represents the fraction of the total pore volume that is filled with carbon dioxide. $E_{saline}$ is defined as the volume fraction of the available subsurface space for $CO_2$ storage and has several components that reflect different physical barriers that inhibit $CO_2$ from contacting all of the pore volume of a given basin or region (see Wang, Y. et al., "Numerical investigation of the storage efficiency factor for $CO_2$ geological sequestration in saline formations," Energy Procedia, 2013, pp. 5267-5274, 37.)

Next, the composition and/or density of the formation water may be analyzed or estimated 408 using standard sampling and laboratory testing procedures. If introducing carbon dioxide within a carbonated aqueous fluid and all of the carbonated aqueous fluid is not being generated from withdrawn formation water, available aqueous fluid sources may be identified and selected 410. Suitable aqueous fluid sources are specified in more detail above.

If not already present, an injection well or a production well may be drilled in the encapsulated salt minibasin to deliver carbonated aqueous fluid (or supercritical carbon dioxide or gaseous carbon dioxide) to the sedimentary rock deposit and optionally to withdraw at least a portion of the formation water from the sedimentary rock deposit. The encapsulated salt minibasin may undergo logging 412 using standard well logging techniques from the injection well, the production well, or a nearby offset well. For example, logging may be conducted by standard wireline analyses, drill cutting analyses, or core analyses (including sidewall cores or whole cores) to confirm the prior seismic analyses. Parameters such as porosity and permeability of the encapsulated salt minibasin may be determined during logging 412. The data from logging 412 and mapping 404 may be further analyzed 414 to determine stratigraphic layering, such as the number and location of storage units and seal units (if any) within the encapsulated salt minibasin, using industry-standard techniques from the petroleum industry.

Before introducing carbon dioxide into the encapsulated salt minibasin, pressure measurement and estimation 416 may be conducted. The initial pressure within the encapsulated salt minibasin may be determined in the injection well by standard pressure measurement techniques within the injection well, such as leakoff testing (LOT), dynamic fracture injection testing (DFIT), modular dynamics testing (MDT), and the like. Pressure measurement and estimation 416 may further include estimation of the maximum pressure at which carbon dioxide may be stored in the encapsulated salt minibasin following introduction thereto. An upper bound for the maximum pressure at which the carbon dioxide may be stored within the pores of the encapsulated salt minibasin can be estimated by the lithostatic pressure. The lithostatic pressure (and hence, the estimated maximum storage pressure) may be estimated by integrating the density from well logging, as specified in Equation 2

$$P_L = \rho_w g z_w + \int_{z_w}^{z} \rho(z) g dz \approx \rho_w g z_w + \overline{\rho} g (z - z_w) \qquad \text{Equation 2}$$

wherein $P_L$ is the lithostatic pressure, $\rho_w$ is the density of water at reservoir conditions, g is the gravitational acceleration constant, z is depth measured from sea level, $z_w$ is water depth measured from sea level, and $\rho(z)$ is formation density as a function of depth z. Equation 2 may be further approximated as Equation 3

$$P_L \approx \rho_w g z_w + \overline{\rho} g (z - z_w) \qquad \text{Equation 3}$$

wherein $\overline{\rho}$ is the mean overburden density (depth integrated average of the overburden) and the other variables are defined as for Equation 2.

Formation density may be measured at various depths and determined during logging 412. In the absence of density values obtained during logging 412, the formation density may be estimated at about 2.3 g/cm$^3$ for sedimentary rocks having about 15% porosity, which provides a pressure gradient of about 1 psi/foot. Overall, the pressure gradient within the encapsulated salt minibasin may range from 0.5 psi/foot to 1.5 psi/foot, or 0.7 psi/foot to 1.3 psi/foot, or 0.8 psi/foot to 1.3 psi/foot, or 0.9 psi/foot to 1.1 psi/foot.

Figure 5:
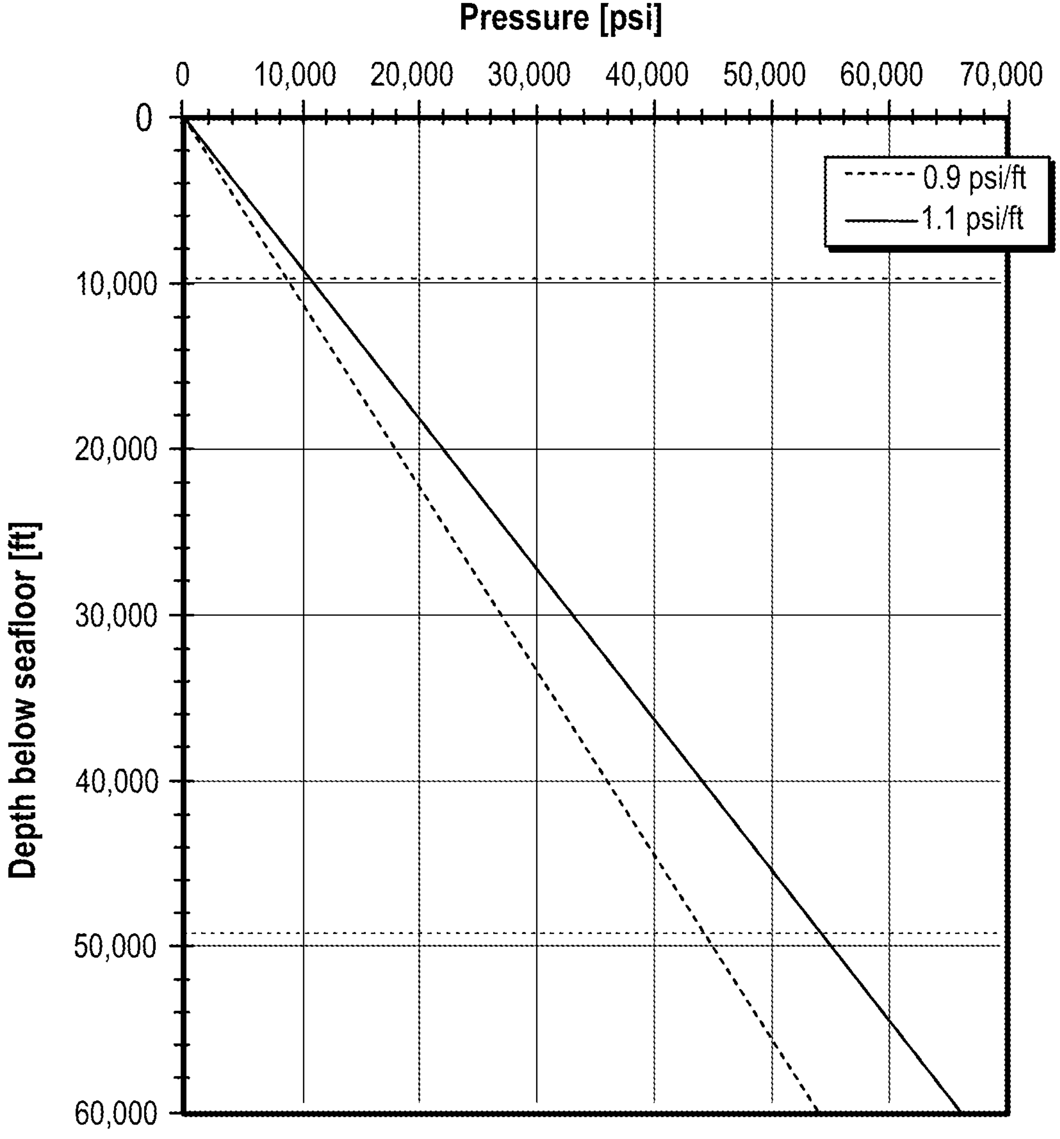
FIG. 5 is an illustrative plot of estimated lithostatic pressure within an encapsulated salt minibasin.

FIG. 5 is an illustrative plot of estimated lithostatic pressure within an encapsulated salt minibasin. The dashed lines in FIG. 5 represent the typical encapsulated salt minibasin depth range of approximately 3-15 kilometers (9,843 feet to 49,213 feet). Estimated lithostatic pressures are shown for pressure gradients of 0.9 psi/foot and 1.1 psi/foot.

Thus, the lithostatic pressure range within representative encapsulated salt minibasins may range from approximately 10,000-50,000 psi. For a given encapsulated salt minibasin chosen for sequestering carbon dioxide therein, the maximum working pressure may be chosen as the pressure limit at the top of the encapsulated salt minibasin (i.e., the shallowest depth relative to the earth's surface, typically the seabed). As shown in FIG. 5, the deeper the encapsulated salt minibasin is located below the earth's surface, the greater the maximum working pressure becomes. Moreover, the deeper the encapsulated salt minibasin is located, the greater the variance becomes between the low-end pressure gradient for the sedimentary rocks (e.g., 0.9 psi/foot) and the high-end pressure gradient for the sedimentary rocks (e.g., 1.1 psi/foot).

A maximum working pressure at which carbon dioxide may be stored in the encapsulated minibasin may be chosen to correspond to the estimated lithostatic pressure at the top of the encapsulated salt minibasin, as described immediately above. To provide a safety margin, the maximum working pressure may be selected to range from about 75% to about 99% of the lithostatic pressure at the top of the encapsulated minibasin, or about 85% to about 98%, or about 90% to about 97%, or about 92% to about 96%.

Once the encapsulated salt minibasin has been satisfactorily characterized and confirmed to be suitable for promoting carbon dioxide sequestration in accordance with the disclosure herein, the carbon dioxide may be introduced thereto in a suitable form for storage. As discussed further above, formation water may be withdrawn from the encapsulated salt minibasin and optionally may be recombined with carbon dioxide to generate a carbonated aqueous fluid suitable for introduction to the encapsulated salt minibasin. This process may be repeated iteratively until the maximum working pressure with the encapsulated salt minibasin has been reached.

Embodiments disclosed herein include:

A. Methods for carbon dioxide sequestration. The methods comprise: introducing a fluid stream comprising carbon dioxide into an encapsulated salt minibasin, the encapsulated salt minibasin being surrounded by a salt barrier defining one or more boundaries thereof; and storing carbon dioxide from the fluid stream within the encapsulated salt minibasin after introduction thereto, the salt barrier retaining the carbon dioxide within the encapsulated salt minibasin.

B. Methods for carbon dioxide sequestration. The methods comprise: providing a fluid stream comprising a carbonated aqueous fluid, gaseous carbon dioxide, supercritical carbon dioxide, or any combination thereof; introducing the fluid stream into an encapsulated salt minibasin, the encapsulated salt minibasin containing formation water native to the encapsulated salt minibasin and the encapsulated salt minibasin being surrounded by a salt barrier defining one or more boundaries of the encapsulated salt minibasin; withdrawing at least a portion of the formation water from the encapsulated salt minibasin to decrease pressure therein; and storing carbon dioxide from the fluid stream within the encapsulated salt minibasin after introduction thereto, the salt barrier retaining the carbon dioxide within the encapsulated salt minibasin.

Each of embodiments A and B may have one or more of the following additional elements in any combination:

Element 1: wherein the fluid stream comprises a carbonated aqueous fluid, gaseous carbon dioxide, supercritical carbon dioxide, or any combination thereof.

Element 1A: wherein the fluid stream comprises a carbonated aqueous fluid, and the carbonated aqueous fluid comprises a carbonated brine or a carbonated aqueous salt solution.

Element 2: wherein the carbonated aqueous fluid comprises a carbonated brine or a carbonated aqueous salt solution.

Element 3: wherein formation water native to the encapsulated salt minibasin is present in the encapsulated salt minibasin, and the method further comprises: withdrawing at least a portion of the formation water from the encapsulated salt minibasin to decrease pressure therein.

Element 4: wherein the fluid stream comprises a carbonated aqueous fluid.

Element 5: wherein the carbonated aqueous fluid is formed by dissolving carbon dioxide in at least a portion of the formation water withdrawn from the encapsulated salt minibasin.

Element 6: wherein the carbonated aqueous fluid is formed at a surface facility in fluid communication with an injection well penetrating the encapsulated salt minibasin.

Element 6A: wherein the fluid stream comprises a carbonated aqueous fluid, and the carbonated aqueous fluid is formed at a surface facility in fluid communication with an injection well penetrating the encapsulated salt minibasin.

Element 7: wherein the carbonated aqueous fluid is formed as the carbon dioxide and one or more aqueous fluids are being introduced to the encapsulated salt minibasin via an injection well penetrating the encapsulated salt minibasin.

Element 7A: wherein the fluid stream comprises a carbonated aqueous fluid, and the carbonated aqueous fluid is formed as the carbon dioxide and one or more aqueous fluids are being introduced to the encapsulated salt minibasin via an injection well penetrating the encapsulated salt minibasin.

Element 8: wherein the formation water comprises a brine.

Element 9: wherein the fluid stream comprises a carbonated aqueous fluid, and the method further comprises: withdrawing a portion of the carbonated aqueous fluid from the encapsulated salt minibasin at a first pressure; introducing additional carbon dioxide thereto; and reinjecting the carbonated aqueous fluid to the encapsulated salt minibasin at a second pressure higher than the first pressure.

Element 9A: wherein the method further comprises: withdrawing a portion of the carbonated aqueous fluid from the encapsulated salt minibasin at a first pressure; introducing additional carbon dioxide thereto; and reinjecting the carbonated aqueous fluid to the encapsulated salt minibasin at a second pressure higher than the first pressure.

Element 10: wherein the fluid stream comprises supercritical carbon dioxide or gaseous carbon dioxide.

Element 11: wherein the encapsulated salt minibasin previously produced a hydrocarbon resource but is no longer producing the hydrocarbon resource when the fluid stream is introduced thereto.

Element 12: wherein the encapsulated salt minibasin is substantially devoid of a producible hydrocarbon resource.

Element 13: wherein the formation water is withdrawn from the encapsulated salt minibasin prior to or concurrently with introducing the carbonated aqueous fluid to the encapsulated salt minibasin.

Element 14: wherein the fluid stream comprises supercritical carbon dioxide or gaseous carbon dioxide.

By way of non-limiting example, exemplary combinations applicable to A and B include, but are not limited to: 1 or 1A, and 3; 1 or 1A, and 4 and 5; 1 or 1A, and 4 and 6; 1 or 1A, and 4 and 7; 1 or 1A, and 8; 1 or 1A, and 9 or 9A; 1 or 1A, and 11; 1 or 1A, and 12; 3 and 4; 3-5; 3, 4, and 6; 3, 4, and 7; 3, and 9 or 9A; 3 and 11; 3 and 12; 4 and 5; 4 and 6; 4 and 7; 4, and 9 or 9A; 4 and 11; 4 and 12; 9 or 9A, and 11; and 9 or 9A, and 12.

Additional embodiments disclosed herein include:

Clause 1. A method comprising:

introducing a fluid stream comprising carbon dioxide into an encapsulated salt minibasin, the encapsulated salt minibasin being surrounded by a salt barrier defining one or more boundaries thereof; and storing carbon dioxide from the fluid stream within the encapsulated salt minibasin after introduction thereto, the salt barrier retaining the carbon dioxide within the encapsulated salt minibasin.

Clause 2. The method of clause 1, wherein the fluid stream comprises a carbonated aqueous fluid, gaseous carbon dioxide, supercritical carbon dioxide, or any combination thereof.

Clause 3. The method of clause 2, wherein the carbonated aqueous fluid comprises a carbonated brine or a carbonated aqueous salt solution.

Clause 4. The method of any one of clauses 1-3, wherein formation water native to the encapsulated salt minibasin is present in the encapsulated salt minibasin, the method further comprising:

withdrawing at least a portion of the formation water from the encapsulated salt minibasin to decrease pressure therein.

Clause 5. The method of clause 4, wherein the fluid stream comprises a carbonated aqueous fluid.

Clause 6. The method of clause 5, wherein the carbonated aqueous fluid is formed by dissolving carbon dioxide in at least a portion of the formation water withdrawn from the encapsulated salt minibasin.

Clause 7. The method of clause 5 or clause 6, wherein the carbonated aqueous fluid is formed at a surface facility in fluid communication with an injection well penetrating the encapsulated salt minibasin.

Clause 8. The method of clause 5 or clause 6, wherein the carbonated aqueous fluid is formed as the carbon dioxide and one or more aqueous fluids are being introduced to the encapsulated salt minibasin via an injection well penetrating the encapsulated salt minibasin.

Clause 9. The method of any one of clauses 4-8, wherein the formation water comprises a brine.

Clause 10. The method of any one of clauses 4-9, wherein the fluid stream comprises a carbonated aqueous fluid, the method further comprising:

withdrawing a portion of the carbonated aqueous fluid from the encapsulated salt minibasin at a first pressure;

introducing additional carbon dioxide thereto; and reinjecting the carbonated aqueous fluid to the encapsulated salt minibasin at a second pressure higher than the first pressure.

Clause 11. The method of clause 4, wherein the fluid stream comprises supercritical carbon dioxide or gaseous carbon dioxide.

Clause 12. The method of any one of clauses 1-11, wherein the encapsulated salt minibasin previously produced a hydrocarbon resource but is no longer producing the hydrocarbon resource when the fluid stream is introduced thereto.

Clause 13. The method of any one of clauses 1-12, wherein the encapsulated salt minibasin is substantially devoid of a producible hydrocarbon resource.

Clause 14. A method comprising:

providing a fluid stream comprising a carbonated aqueous fluid, gaseous carbon dioxide, supercritical carbon dioxide, or any combination thereof;

introducing the fluid stream into an encapsulated salt minibasin, the encapsulated salt minibasin containing formation water native to the encapsulated salt minibasin and the encapsulated salt minibasin being surrounded by a salt barrier defining one or more boundaries of the encapsulated salt minibasin;

withdrawing at least a portion of the formation water from the encapsulated salt minibasin to decrease pressure therein; and storing carbon dioxide from the fluid stream within the encapsulated salt minibasin after introduction thereto, the salt barrier retaining the carbon dioxide within the encapsulated salt minibasin.

Clause 15. The method of clause 14, wherein the fluid stream comprises a carbonated aqueous fluid, and the carbonated aqueous fluid comprises a carbonated brine or a carbonated aqueous salt solution.

Clause 16. The method of clause 14 or clause 15, wherein the carbonated aqueous fluid is formed by dissolving carbon dioxide in at least a portion of the formation water withdrawn from the encapsulated salt minibasin.

Clause 17. The method of any one of clauses 14-16, wherein the fluid stream comprises a carbonated aqueous fluid, and the carbonated aqueous fluid is formed at a surface facility in fluid communication with an injection well penetrating the encapsulated salt minibasin.

Clause 18. The method of any one of clauses 14-16, wherein the fluid stream comprises a carbonated aqueous fluid, and the carbonated aqueous fluid is formed as the carbon dioxide and one or more aqueous fluids are being introduced to the encapsulated salt minibasin via an injection well.

Clause 19. The method of any one of clauses 14-18, wherein the formation water comprises a brine.

Clause 20. The method of any one of clauses 14-19, wherein the fluid stream comprises a carbonated aqueous fluid, the method further comprising:

withdrawing a portion of the carbonated aqueous fluid from the encapsulated salt minibasin at a first pressure;

introducing additional carbon dioxide thereto; and reinjecting the carbonated aqueous fluid to the encapsulated salt minibasin at a second pressure higher than the first pressure.

Clause 21. The method of any one of clauses 14-20, wherein the formation water is withdrawn from the encapsulated salt minibasin prior to or concurrently with introducing the carbonated aqueous fluid to the encapsulated salt minibasin.

Clause 22. The method of clause 14, wherein the fluid stream comprises supercritical carbon dioxide or gaseous carbon dioxide.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:

introducing a fluid stream comprising carbon dioxide into an encapsulated salt minibasin, the encapsulated salt minibasin comprising a sedimentary rock deposit surrounded by a salt barrier, the salt barrier defining one or more boundaries of the encapsulated salt minibasin; and storing carbon dioxide from the fluid stream within the sedimentary rock deposit of the encapsulated salt minibasin after introduction thereto, the salt barrier retaining the carbon dioxide within the encapsulated salt minibasin.

2. The method of claim 1, wherein the fluid stream comprises a carbonated aqueous fluid, gaseous carbon dioxide, supercritical carbon dioxide, or any combination thereof.

3. The method of claim 2, wherein the carbonated aqueous fluid comprises a carbonated brine or a carbonated aqueous salt solution.

4. The method of claim 1, wherein formation water native to the encapsulated salt minibasin is present in the encapsulated salt minibasin, the method further comprising:

withdrawing at least a portion of the formation water from the encapsulated salt minibasin to decrease pressure therein.

5. The method of claim 4, wherein the fluid stream comprises a carbonated aqueous fluid.

6. The method of claim 5, wherein the carbonated aqueous fluid is formed by dissolving carbon dioxide in at least a portion of the formation water withdrawn from the encapsulated salt minibasin.

7. The method of claim 5, wherein the carbonated aqueous fluid is formed at a surface facility in fluid communication with an injection well penetrating the encapsulated salt minibasin.

8. The method of claim 5, wherein the carbonated aqueous fluid is formed as the carbon dioxide and one or more aqueous fluids are being introduced to the encapsulated salt minibasin via an injection well penetrating the encapsulated salt minibasin.

9. The method of claim 4, wherein the formation water comprises a brine.

10. The method of claim 4, wherein the fluid stream comprises a carbonated aqueous fluid, the method further comprising:

withdrawing a portion of the carbonated aqueous fluid from the encapsulated salt minibasin at a first pressure;

introducing additional carbon dioxide thereto; and reinjecting the carbonated aqueous fluid to the encapsulated salt minibasin at a second pressure higher than the first pressure.

11. The method of claim 4, wherein the fluid stream comprises supercritical carbon dioxide or gaseous carbon dioxide.

12. The method of claim 1, wherein the encapsulated salt minibasin previously produced a hydrocarbon resource but is no longer producing the hydrocarbon resource when the fluid stream is introduced thereto.

13. The method of claim 1, wherein the encapsulated salt minibasin is substantially devoid of a producible hydrocarbon resource.

14. A method comprising:

providing a fluid stream comprising a carbonated aqueous fluid, gaseous carbon dioxide, supercritical carbon dioxide, or any combination thereof;

introducing the fluid stream into an encapsulated salt minibasin, the encapsulated salt minibasin containing formation water native to the encapsulated salt minibasin and the encapsulated salt minibasin comprising a sedimentary rock deposit surrounded by a salt barrier, the salt barrier defining one or more boundaries of the encapsulated salt minibasin;

withdrawing at least a portion of the formation water from the encapsulated salt minibasin to decrease pressure therein; and storing carbon dioxide from the fluid stream within the sedimentary rock deposit of the encapsulated salt minibasin after introduction thereto, the salt barrier retaining the carbon dioxide within the encapsulated salt minibasin.

15. The method of claim 14, wherein the fluid stream comprises a carbonated aqueous fluid, and the carbonated aqueous fluid comprises a carbonated brine or a carbonated aqueous salt solution.

16. The method of claim 15, wherein the carbonated aqueous fluid is formed by dissolving carbon dioxide in at least a portion of the formation water withdrawn from the encapsulated salt minibasin.

17. The method of claim 14, wherein the fluid stream comprises a carbonated aqueous fluid, and the carbonated aqueous fluid is formed at a surface facility in fluid communication with an injection well penetrating the encapsulated salt minibasin.

18. The method of claim 14, wherein the fluid stream comprises a carbonated aqueous fluid, and the carbonated aqueous fluid is formed as the carbon dioxide and one or more aqueous fluids are being introduced to the encapsulated salt minibasin via an injection well.

19. The method of claim 14, wherein the formation water comprises a brine.

20. The method of claim 14, wherein the fluid stream comprises a carbonated aqueous fluid, the method further comprising:

withdrawing a portion of the carbonated aqueous fluid from the encapsulated salt minibasin at a first pressure;

introducing additional carbon dioxide thereto; and reinjecting the carbonated aqueous fluid to the encapsulated salt minibasin at a second pressure higher than the first pressure.

21. The method of claim 14, wherein the fluid stream comprises a carbonated aqueous fluid, and the formation water is withdrawn from the encapsulated salt minibasin prior to or concurrently with introducing the carbonated aqueous fluid to the encapsulated salt minibasin.

22. The method of claim 14, wherein the fluid stream comprises supercritical carbon dioxide or gaseous carbon dioxide.

* * * * *